US012568953B1

(12) United States Patent
McGrath et al.

(10) Patent No.: US 12,568,953 B1
(45) Date of Patent: Mar. 10, 2026

(54) DEVICE FOR DETERRING YARD PESTS

(71) Applicants: Donald T. McGrath, Colorado Springs, CO (US); Louis Price, Colorado Springs, CO (US); Sachin Pandya, Colorado Springs, CO (US)

(72) Inventors: Donald T. McGrath, Colorado Springs, CO (US); Louis Price, Colorado Springs, CO (US); Sachin Pandya, Colorado Springs, CO (US)

(73) Assignee: Avalanche Water Systems, LLC, Colorado Springs, CO (US)

( * ) Notice: Subject to any disclaimer, the term of this patent is extended or adjusted under 35 U.S.C. 154(b) by 0 days.

(21) Appl. No.: 19/069,298

(22) Filed: Mar. 4, 2025

(51) Int. Cl.
*A01M 29/12* (2011.01)

(52) U.S. Cl.
CPC .................................. *A01M 29/12* (2013.01)

(58) Field of Classification Search
CPC ........................... A01M 29/12; A01M 17/002
See application file for complete search history.

(56) References Cited

U.S. PATENT DOCUMENTS

| | | | | | |
|---|---|---|---|---|---|
| 4,552,307 | A | * | 11/1985 | Stedham | A01M 29/12 |
| | | | | | 239/57 |
| 5,083,708 | A | * | 1/1992 | Walters | A01M 29/12 |
| | | | | | 239/57 |
| 5,379,545 | A | * | 1/1995 | Gall | A01M 31/008 |
| | | | | | 239/57 |
| 6,745,950 | B1 | * | 6/2004 | Longo | A01M 31/008 |
| | | | | | 239/145 |
| 7,937,886 | B2 | * | 5/2011 | Bernard | A01M 1/2011 |
| | | | | | 43/131 |
| 12,471,511 | B2 | * | 11/2025 | NewDelman | A01C 23/026 |
| 2007/0248688 | A1 | * | 10/2007 | La Torre | A61K 31/12 |
| | | | | | 424/754 |
| 2024/0032449 | A1 | * | 2/2024 | NewDelman | A01B 49/065 |

FOREIGN PATENT DOCUMENTS

| | | | | | |
|---|---|---|---|---|---|
| DE | 202019003066 | U1 | * | 8/2019 | ............ A01M 29/12 |
| DE | 102020124806 | A1 | * | 3/2022 | .......... A01M 17/002 |

\* cited by examiner

*Primary Examiner* — Christopher D Hutchens
(74) *Attorney, Agent, or Firm* — Sam Pierce

(57) ABSTRACT

According to an aspect of the present invention disclosed herein, there is provided a device for deterring yard pests, comprising: a cap; an interior hollow tube; a spike; a plurality of sponges in the interior hollow tube, wherein the sponges are impregnate with a chemical composition for deterring yard pests; a plurality of diffusion holes, wherein the gauge of the diffusion holes is smaller than the size of the sponges.

6 Claims, 1 Drawing Sheet

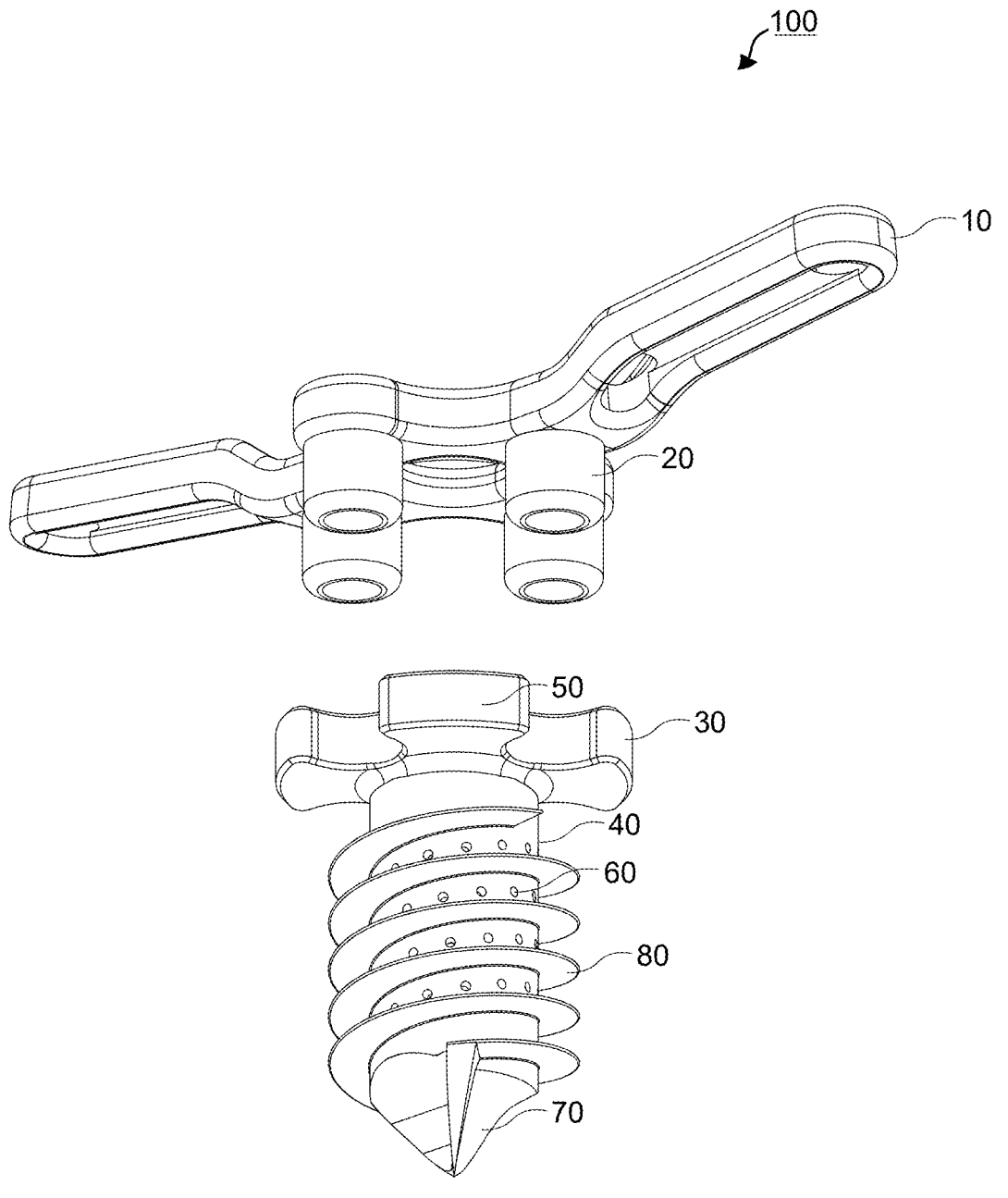

DEVICE FOR DETERRING YARD PESTS

BACKGROUND

The present invention is in the field of devices and methods for deterring yard pests. A variety of solutions have been proposed in the prior art patent literature.

Relevant prior art includes U.S. Pat. No. 5,548,921 which discloses a system and method for gassing an animal, such as a gopher, within an underground burrow, which comprises a probe having a shaft with first and second ends and a tip on the first end. A shallow hole is formed in the ground with the tip of the probe to locate the burrow and dry solid chlorine material is introduced into the burrow.

U.S. Pat. No. 9,125,393 discloses a burrowing rodent extermination device comprising a stick form poison bait in a dispenser. The dispenser has an elongated tubular body with a foot disposed to slide thereon for setting ground penetration depth. The bait stick is gravity fed into a rodent tunnel through the tubular body thereby providing more bait for consumption. A rod is attached to the top of the bait stick for lowering and lifting without any human contact. The rod is visible above ground and indicates consumption of the bait stick. A marker is attached to a top portion of the rod to make the device more visible.

However, the prior art typically utilizes lethal means which is undesirable in many circumstances at least because the carcasses of yard pests are unpleasant to handle.

SUMMARY OF INVENTION

Therefore, the present invention is a tubular device which inserts into the ground and deters pests such as gophers with non-lethal compounds to be administered by diffusing through a spongy matrix.

According to an aspect of the present invention disclosed herein, there is provided a device for deterring yard pests, comprising: a cap; an interior hollow tube; a spike; a plurality of sponges in the interior hollow tube, wherein the sponges are impregnate with a chemical composition for deterring yard pests; a plurality of diffusion holes, wherein the gauge of the diffusion holes is smaller than the size of the sponges.

BRIEF DESCRIPTION OF THE DRAWINGS

FIG. 1 is an illustration of the device according to an embodiment of the present invention.

DETAILED DESCRIPTION

Embodiments of the present invention will be described with reference to the following drawings.

FIG. 1 is an illustration of the device according to an embodiment of the present invention.

Device 100 is a tubular device which inserts into the ground and deters pests such as gophers with non-lethal compounds to be administered by diffusing through a spongy matrix.

The following components of device 100 are illustrated:

10—Handle
20—locking projections
30—auger
40—auger housing
50—counter projections for locking
60—pores in the housing for sponges
70—tip
80—blades The handle for device 100 can be used to hold on to the device 100 when transporting device 100.

The cap allows access to the interior tube of the device 100 by screwing threads into and out of the top plate.

Diffusion holes allow for chemical compounds which deter yard pests to exit the device 100. Flanges are provided to keep dirt out of diffusion holes.

A spike has a pointed tip for boring into the ground. The threads on spike and the sharp tip facilitate boring the device 100 into the ground where gophers and other burrowing animals are present and can be deterred from a user's property.

Sponges are impregnated with chemical compounds which diffuse out of the device 100 through diffusion holes. The sponges are large than diffusion holes so the sponges stay inside the interior tube of device 100.

A variety of chemical compounds can be used to impregnate sponges, depending on the particular yard pest the user desires to deter from the user's property. The device is especially ideal for deterring gophers and other burrowing pests, but can also deter larger animals as well as insets.

Example compounds to deter bears:
Ammonia
Cidar Vinegar
Lysol
Neem Oil
Pine Oil
Example compounds to deter deer:
Ammonia
Cayenne Pepper
Garlic
Oil Soap
Vinegar
Example compounds to deter coyotes:
Cayenne Pepper
Chili Pepper
Vinegar
Example compounds to deter mosquitoes:
Basi
Citronella Oil
Clove
Geranium Oil
Lavender
Peppermint Oil
Pine Oil
Example compounds to deter mice:
Ammonia
Bleach
Cayenne Pepper
Cinnamon Oil
Garlic
Peppermint Oil
Vinegar
Example compounds to deter prairie dogs:
Cayenne Pepper
Cinnamon Oil
Coffee Grounds
Garlic
Peppermint Oil
Example compounds to deter rabbits:
Cayenne
Garlic
Vinegar
Raccoons
Cayenne
Garlic Onion Peppermint Oil Example compounds to deter squirrels:

Coffee

Cinnamon Oil

Garlic

Peppermint Oil

Example compounds to deter subterranean rodents and mammals:

Castor Oil

Cayenne

Chili Pepper

Garlic

Jalapeno

Vinegar

White Onion

The illustrations of embodiments described herein are intended to provide a general understanding of the structure of various embodiments, and they are not intended to serve as a complete description of all the elements and features of apparatus and systems that might make use of the structures described herein. Other embodiments may be utilized and derived therefrom, such that structural and logical substitutions and changes may be made without departing from the scope of this disclosure.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed.

FIGURES are also merely representational and may not be drawn to scale. Certain proportions thereof may be exaggerated, while others may be minimized. Accordingly, the specification and drawings are to be regarded in an illustrative rather than a restrictive sense.

What is claimed is:

1. A device for deterring yard pests, comprising:

a cap;

an interior hollow tube;

a helical auger configured to bore into the ground;

a spike at the end of the helical auger configured to contact the ground;

a plurality of sponges in the interior hollow tube, wherein the sponges are impregnate with a chemical composition for deterring yard pests;

a plurality of diffusion holes, wherein the gauge of the diffusion holes is smaller than the size of the sponges;

wherein the helical auger comprises a plurality of blades arranged in a helix adjacent to the diffusion holes.

2. The device for deterring yard pests of claim 1, wherein the cap is threaded to screw into the interior hollow tube.

3. The device for deterring yard pests of claim 1, wherein the spike is threaded to screw into the ground.

4. The device for deterring yard pests of claim 1, further comprising a handle.

5. The device for deterring yard pests of claim 1, further comprising a handle circular with indentations on two sides to allow for a user to screw the device into the ground.

6. The device for deterring yard pests of claim 1, wherein the sponges are impregnated with vinegar.

\* \* \* \* \*